United States Patent
McColloch et al.

(10) Patent No.: US 8,876,413 B2
(45) Date of Patent: Nov. 4, 2014

(54) METHOD AND SYSTEM FOR PROVIDING ELECTROMAGNETIC INTERFERENCE (EMI) SHIELDING IN AN OPTICAL COMMUNICATIONS MODULE

(71) Applicant: Avago Technologies General IP (Singapore) Pte. Ltd., Singapore (SG)

(72) Inventors: Laurence R. McColloch, Santa Clara, CA (US); Sanjeev Gupta, Santa Rosa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 48 days.

(21) Appl. No.: 13/804,281

(22) Filed: Mar. 14, 2013

(65) Prior Publication Data

US 2014/0270657 A1     Sep. 18, 2014

(51) Int. Cl.
*G02B 6/00*     (2006.01)
*G02B 6/36*     (2006.01)
*G02B 1/10*     (2006.01)

(52) U.S. Cl.
CPC ... *G02B 6/36* (2013.01); *G02B 1/10* (2013.01)
USPC ............................................. 385/92; 385/147

(58) Field of Classification Search
USPC .............................. 385/88–92, 137–139, 147
See application file for complete search history.

(56) References Cited

U.S. PATENT DOCUMENTS

| | | | |
|---|---|---|---|
| 4,107,640 A * | 8/1978 | Asano et al. | 338/23 |
| 4,667,391 A * | 5/1987 | Chapuy et al. | 438/48 |
| 5,814,761 A | 9/1998 | Piazza | |
| 6,285,111 B1 * | 9/2001 | Hulsing, II | 310/306 |
| 6,798,559 B2 * | 9/2004 | Moulin | 359/288 |
| 7,336,221 B2 | 2/2008 | Matsuo et al. | |
| 7,488,901 B2 | 2/2009 | Arnold | |
| 7,981,582 B2 * | 7/2011 | Veregin et al. | 430/109.4 |
| 2006/0292475 A1 * | 12/2006 | Veregin et al. | 430/109.3 |
| 2012/0067871 A1 | 3/2012 | Sherrer et al. | |
| 2014/0138368 A1 * | 5/2014 | Verstraeten et al. | 219/202 |

OTHER PUBLICATIONS

H.M. Schlicke, Theory of Simulated-Skin-Effect Filters a Thin Film Approach to EMI, Article, Jan. 1964, p. 47-54, vol. 6 Issue 1, IEEE Transactions on Electromagnetic Compatibility, United States of America.

* cited by examiner

*Primary Examiner* — Akm Enayet Ullah

(57) ABSTRACT

An optical communications module is provided with an EMI shielding system that comprises a resistive coating disposed on one or more inner surfaces of the module housing. The resistive coating has a thickness that is greater than or equal to one skin depth and has a resistivity that is low enough to support electrical current flow, but high enough to absorb EMI radiation of a particular wavelength or wavelength range. The combination of these features causes EMI radiation to propagate in the resistive coating due to skin effect. The resistive coating absorbs at least a portion of the EMI radiation propagating therein.

20 Claims, 6 Drawing Sheets

METHOD AND SYSTEM FOR PROVIDING ELECTROMAGNETIC INTERFERENCE (EMI) SHIELDING IN AN OPTICAL COMMUNICATIONS MODULE

TECHNICAL FIELD OF THE INVENTION

The invention relates to optical communications modules. More particularly, the invention relates to a method and system for use in an optical communications module for providing electromagnetic interference (EMI) shielding.

BACKGROUND OF THE INVENTION

A variety of parallel optical communications modules exist for simultaneously transmitting and/or receiving multiple optical data signals over multiple respective optical data channels. Parallel optical transmitter modules have multiple optical transmit channels for transmitting multiple respective optical data signals simultaneously over multiple respective optical waveguides (e.g., optical fibers). Parallel optical receiver modules have multiple optical receive channels for receiving multiple respective optical data signals simultaneously over multiple respective optical waveguides. Parallel optical transceiver modules have multiple optical transmit and receive channels for transmitting and receiving multiple respective optical transmit and receive data signals simultaneously over multiple respective transmit and receive optical waveguides.

The transmit (Tx) portion of a parallel optical transmitter or transceiver module includes a laser driver circuit and an array of laser diodes. The laser driver circuit outputs an electrical drive signal to each respective laser diode to cause the respective laser diode to be modulated. When the laser diode is modulated, it outputs optical signals that have power levels corresponding to logic 1s and logic 0s. An optics system of the optical transceiver or transmitter module focuses the optical signals produced by each respective laser diode into the end of a respective transmit optical fiber held within an optical connector module that mates with a receptacle of the optical transceiver module.

The receive (Rx) portion of a parallel optical receiver or transceiver module includes at least an array of receive photodiodes that receive incoming optical signals output from the ends of respective receive optical fibers held in an optical connector module that mates with a receptacle of the optical receiver or transceiver module. The optics system of the transceiver or receiver module focuses the light that is output from the end of each receive optical fiber onto the respective receive photodiode. The respective receive photodiode converts the incoming optical signal into an electrical analog signal. An electrical detection circuit, such as a transimpedance amplifier (TIA), receives the electrical signal produced by the receive photodiode and outputs a corresponding amplified electrical signal, which is processed by other circuitry of the RX portion to recover the data.

In most parallel optical communications modules, the receptacle with which the optical connector module mates constitutes an electromagnetic interference (EMI) open aperture that allows EMI to escape from the housing of the parallel optical communications module. The Federal Communications Commission (FCC) has set standards that limit the amount of electromagnetic radiation that may emanate from unintended sources. For this reason, a variety of techniques and designs are used to shield EMI open apertures in module housings in order to limit the amount of EMI that passes through the apertures. Various metal shielding designs and resins that contain metallic material have been used to cover areas from which EMI may escape from the housings. So far, such techniques and designs have had only limited success, especially with respect to parallel optical communications modules that transmit and/or receive data at very high data rates (e.g., 10 gigabits per second (Gbps)).

For example, EMI collars are often used with pluggable optical communications modules to provide EMI shielding. The EMI collars in use today vary in construction, but generally include a band portion that is secured about the exterior of the transceiver module housing and spring fingers having proximal ends that attach to the band portion and distal ends that extend away from the proximal ends. The spring fingers are periodically spaced about the collar. The spring fingers have folds in them near their distal ends that cause the distal ends to be directed inwards toward the transceiver module housing and come into contact with the housing at periodically-spaced points on the housing. At the locations where the folds occur near the distal ends of the spring fingers, the outer surfaces of the spring fingers are in contact with the inner surface of the cage at periodically spaced contact points along the inner surface of the cage. Such EMI collar designs are based on Faraday cage principles.

The amount of EMI that passes through an EMI shielding device is proportional to the largest dimension of the largest EMI open aperture of the EMI shielding device. Therefore, EMI shielding devices such as EMI collars and other devices are designed to ensure that there is no open aperture that has a dimension that exceeds the maximum allowable EMI open aperture dimension associated with the frequency of interest. For example, in the known EMI collars of the type described above, the spacing between the locations at which the distal ends of the spring fingers come into contact with the inner surface of the cage should not exceed one quarter wavelength of the frequency of interest that is being attenuated. Even greater attenuation of the frequency of interest can be achieved by making the maximum EMI open aperture dimension significantly less than one quarter of a wavelength, such as, for example, one eighth or one tenth of a wavelength. However, the ability to decrease this spacing using currently available manufacturing techniques is limited. In addition, as the frequency of optical communications modules increases, this spacing needs to be made smaller in order to effectively shield EMI, which becomes increasingly difficult or impossible to achieve at very high frequencies.

In general, all of the current techniques of providing EMI shielding in optical communications modules attempt to ensure that there are no EMI open apertures that have dimensions that exceed the maximum allowable EMI open aperture dimension. As indicated above, as the frequencies or bit rates of optical communications modules continue to increase (i.e., wavelengths continue to decrease), it becomes extremely difficult or impossible to effectively implement these types of solutions. Accordingly, a need exists for an EMI shielding system and a method that do not rely solely on such techniques and that provide an effective EMI shielding solution in optical communications modules.

SUMMARY OF THE INVENTION

The invention is directed to an optical communications module having an EMI shielding system and a method for providing an optical communications module with EMI shielding. The optical communications module comprises an optical communications module housing and a resistive coating disposed on at least one inner surface of the module housing. The resistive coating has a thickness that is equal to or greater than one skin depth and has a resistivity that ranges from about 10 ohm-meter to about 400 ohm-meter. The resistive coating absorbs at least a portion of EMI radiation produced by at least one source of EMI disposed on or in the optical communications module.

The method comprises providing an optical communications module and disposing a resistive coating on at least one inner surface of the housing. The resistive coating has a thickness that is equal to or greater than one skin depth and has a resistivity that ranges from about 10 ohm-meter to about 400 ohm-meter. The resistive coating absorbs at least a portion of EMI radiation produced by at least one source of EMI disposed on or in the optical communications module.

These and other features and advantages of the invention will become apparent from the following description, drawings and claims.

DETAILED DESCRIPTION OF AN ILLUSTRATIVE EMBODIMENT

Figure 1:
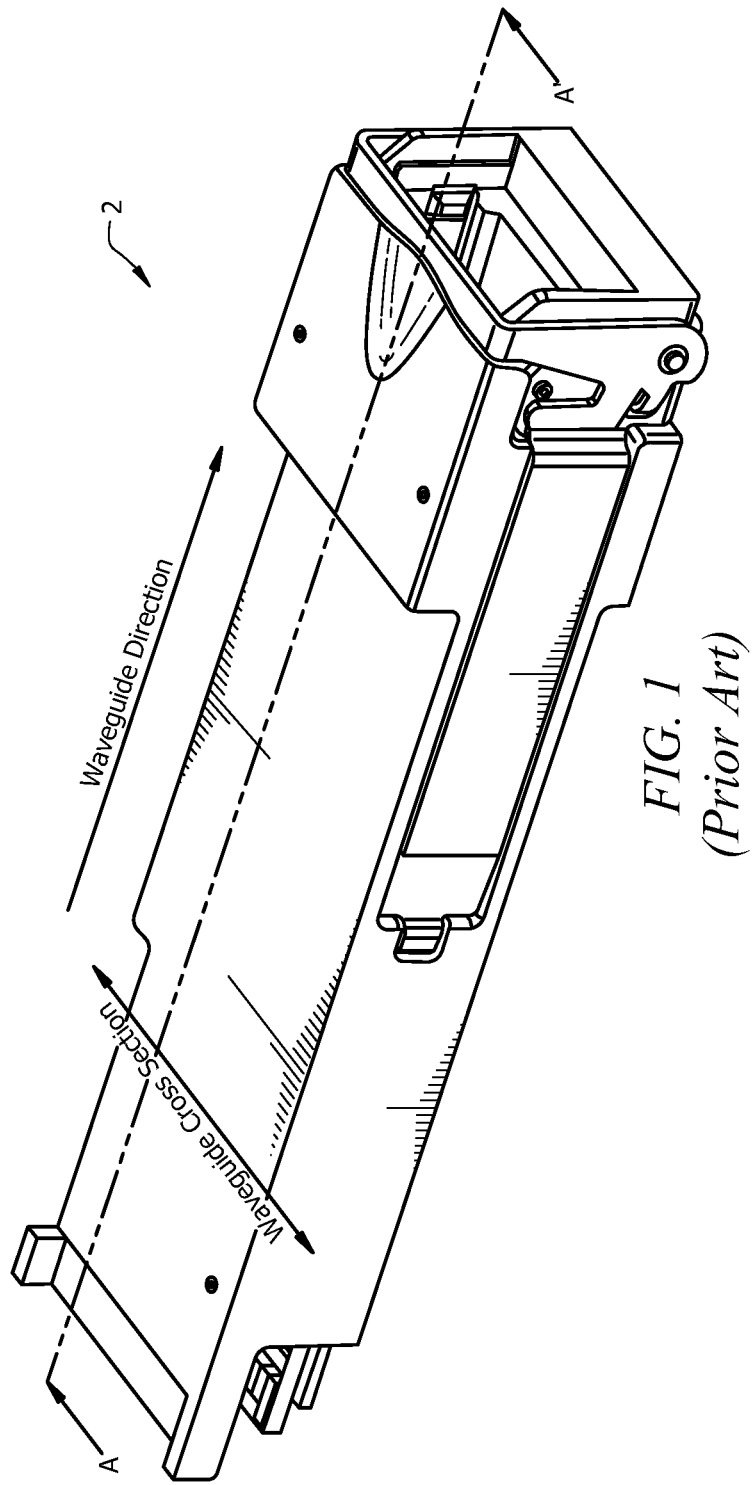
FIG. 1 illustrates a top perspective view of an optical communications module known as a quad small form factor pluggable (QSFP) optical transceiver module having a metal module housing that acts as a waveguide for EMI radiation.

In accordance with the invention, an optical communications module is equipped with an EMI shielding system that comprises a resistive coating disposed on one or more surfaces of the module housing. The resistive coating has a thickness that is greater than or equal to at least one skin depth and has a resistivity that is low enough to support electrical current flow, but high enough to absorb EMI radiation of a particular wavelength or wavelength range. The combination of these features causes circulating current induced in the walls of the module housing by EMI radiation to propagate in the resistive coating due to skin effect. The resistive coating absorbs at least a portion of the EMI radiation propagating therein. Illustrative, or exemplary, embodiments of the invention will be described below with reference to FIGS. 3-6.

In electromagnetism, an alternating electrical current (AC) propagating in an electrical conductor has a tendency to become distributed within the conductor such that the current density is largest near the surface of the conductor and decreases with greater depths into the conductor. For this reason, the electrical current is said to flow primarily in the "skin" of the conductor, i.e., between the outer surface of the conductor and a level within the conductor that is at a particular depth. This effect is commonly referred to as the skin effect, and the depth at which most of the current is distributed within the conductor is commonly referred to as the skin depth. The skin depth is a function of the frequency of the AC current and the resistivity of the conductor material. For a given conductor, the skin depth decreases as the frequency of the AC current increases.

In accordance with the invention, it has been determined that an effective EMI shielding solution that overcomes the aforementioned disadvantages of known EMI shielding solutions can be achieved by applying a resistive coating to at least one inner surface of an optical communications module housing, where the resistive coating has a preselected resistivity and a preselected thickness. The resistivity of the coating is high enough to effectively attenuate EMI radiation, but also low enough to support electrical current flow. The thickness of the coating is at least one skin depth. The combination of these features causes the circulating current produced by EMI radiation propagating in the module housing to be concentrated in the resistive coating due to the skin effect. The resistive coating is lossy, and therefore absorbs the EMI radiation.

A typical optical communications module housing is made of die cast zinc or sheet metal. In such housings, there is very low resistance to the circulating current. Also, the module housing operates as an efficient waveguide, and reflections of EMI at each end of the housing are also efficient. Consequently, the waveguide acts as a high pass filter that attenuates low frequency signals while transmitting high frequency signals with minimum losses. The lowest cutoff wavelength and frequency for the dominant transverse electric field mode, the $TE_{10}$ mode, which is the dominant mode in rectangular waveguides, are defined as: $\lambda_{c10}=2a$ and $f_c=u'/2a$, respectively, where a denotes the width of the waveguide and u' denotes the wave velocity. The resistive coating of the invention is designed to absorb EMI radiation corresponding at least to the $TE_{10}$ mode, although the resistive coating will typically absorb other modes as well.

In accordance with illustrative embodiments described herein, the principles of skin effect, skin depth and circulating currents are used to design a resistive coating that limits the amount of EMI radiation that can escape from the optical module housing. To accomplish this, the conductor losses are purposely made much higher by disposing the resistive coating on one or more inner surfaces of the module housing. The resistive coating has a resistivity that ranges from about 10 ohm-meter to about 400 ohm-meter, and is typically in the range of from about 40 ohm-meter to about 70 ohm-meter. The thickness of the resistive coating is greater than or equal to one skin depth. As indicated above, the skin depth is a function of the frequency and the resistivity of the conductor material. Thus, the thickness and the resistivity of the resistive coating will be selected based at least in part on the frequency or wavelength of the EMI radiation that the coating is intended to absorb or attenuate.

The resistive coating may be made of various materials and may be disposed on the inner surface of the module housing in various ways. For example, the resistive coating may be a nickel-chromium material that is disposed on one or more inner surface of the module housing via a plating process. As another example, the resistive coating may be in the form of one or more resistive cards made up of one or more of the following resistive materials: mica, Kapton™ polyimide film, Mylar™ polyester film, and fused silica. The card is secured to an inner surface of the module housing. As another example, the resistive coating may comprise an oil-based or water-based paint that is painted onto at least one inner surface of the module housing. The paint is typically carbon-loaded or graphite-loaded paint. As yet another example, the resistive coating may comprise a graphite material. As yet another example, the resistive coating may be a semiconductor material, such as silicon that has been doped with elements (e.g., III/V elements such as boron and arsenic) to provide the material with the desired resistivity. As yet another example, the resistive coating may be a carbon-loaded epoxy. As yet another example, the resistive coating may be stainless steel plating.

The resistive coating will typically be applied by a process such as plating, spraying, adhering or printing, although other application processes may be used for this purpose, including dipping the module housing into a liquid coating material or brushing the coating material onto the module housing. The resistive coating may also be applied by a process of the type that is often used in semiconductor manufacturing processes, such as sputtering, evaporation or electrolysis. Although the above-described materials and processes are suitable for use in the invention, it should be noted that the invention is not limited with respect to the material that is used as the resistive material or with respect to the process that is used to dispose the resistive material on one or more inner surfaces of the module housing.

Figure 2:
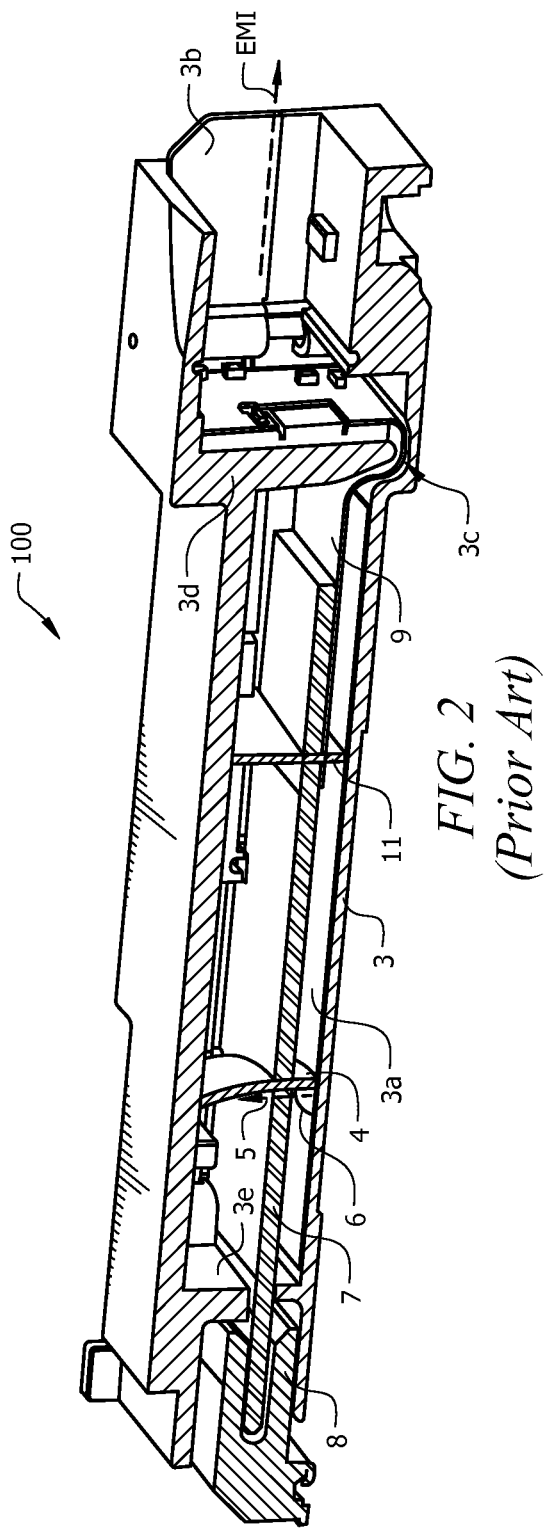
FIG. 2 illustrates a side cross-sectional view of the module shown in FIG. 1 taken along line A-A', which demonstrates the manner in which an EMI wave propagates through the module housing and effects of the EMI wave.

FIG. 1 illustrates a top perspective view of a known optical communications module 2 called a quad small form factor pluggable (QSFP) optical transceiver module having a metal module housing 3 that acts as a waveguide for EMI radiation. FIG. 2 illustrates a side cross-sectional view of the module 2 shown in FIG. 1 taken along line A-A', which demonstrates an EMI wave 4 propagating through the module housing 3 and the circulating current 5 that is generated by the EMI wave 4 on an inner surface 3a of the module housing 3. The manner in which EMI radiation generated by one or more EMI sources of the module 2 propagates through the module housing 3 and can escape from the module housing 3 will now be described with reference to FIGS. 1 and 2.

For the EMI wave 4 propagating as shown, the electric field vector is pointing up as represented by arrow 5. In the module housing 3, which acts as a waveguide, the wave 4 induces circulating currents 6 in the surface 3a of the housing 3. Most of the current 6 induced in the housing 3 by the EMI wave 4 is limited to propagating within one skin depth of the housing. The primary sources of the EMI radiation in the module 2 are the printed circuit board (PCB) 7, integrated circuits (ICs) (not shown) mounted on the PCB 7, and an electrical connector 8 electrically connected to an end of the PCB 7. The connector 8 has significant impedance discontinuities and is physically large, which makes it a good antenna and an efficient radiator. The ICs are typically the primary sources of EMI, and the connector 8 is commonly the antenna responsible for the largest share of EMI radiation. The common rectangular metal module housing 3 forms an efficient waveguide for the EMI radiation from the connector 8. The EMI radiation travels down the module housing 3 as EMI wave 4, either to be emitted from the front 3b of the housing 3 (arrow labeled "EMI") by escaping through unshielded areas, such as, for example, the opening 3c in the housing 3 through which the flex circuit 9 passes, or to be reflected between ends 3d and 3e of the housing 3. The reflected EMI wave 11 will continue to be reflected within the housing 3 until the EMI radiation is absorbed or is emitted out of the housing 3 through a seam, leak, or hole in the housing 3.

Figure 3:
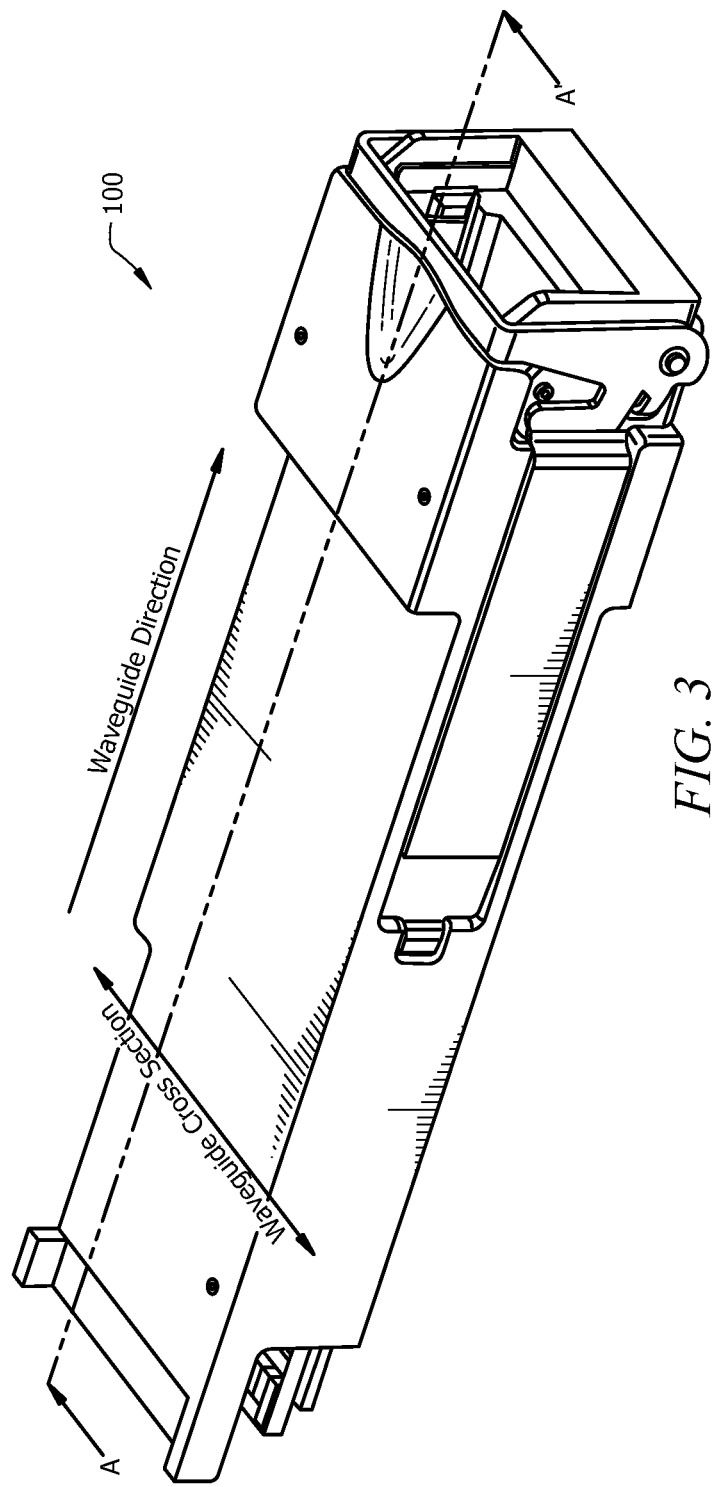
FIG. 3 illustrates a top perspective view of a QSFP optical communications module similar to that shown in FIG. 1, except that the QSFP module shown in FIG. 3 incorporates an illustrative embodiment of the EMI shielding system of the invention.
Figure 4:
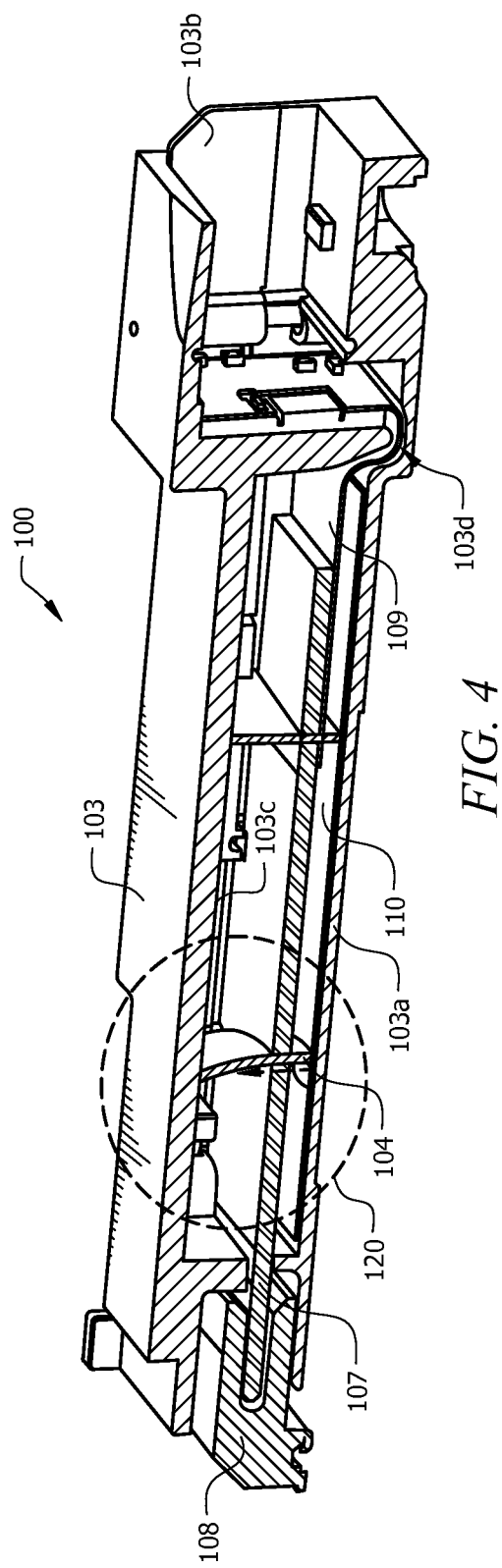
FIG. 4 illustrates a side cross-sectional view of the module shown in FIG. 3 taken along line A-A', which shows the resistive coating of the EMI shielding system disposed on an inner surface of the metal module housing.
Figure 5:
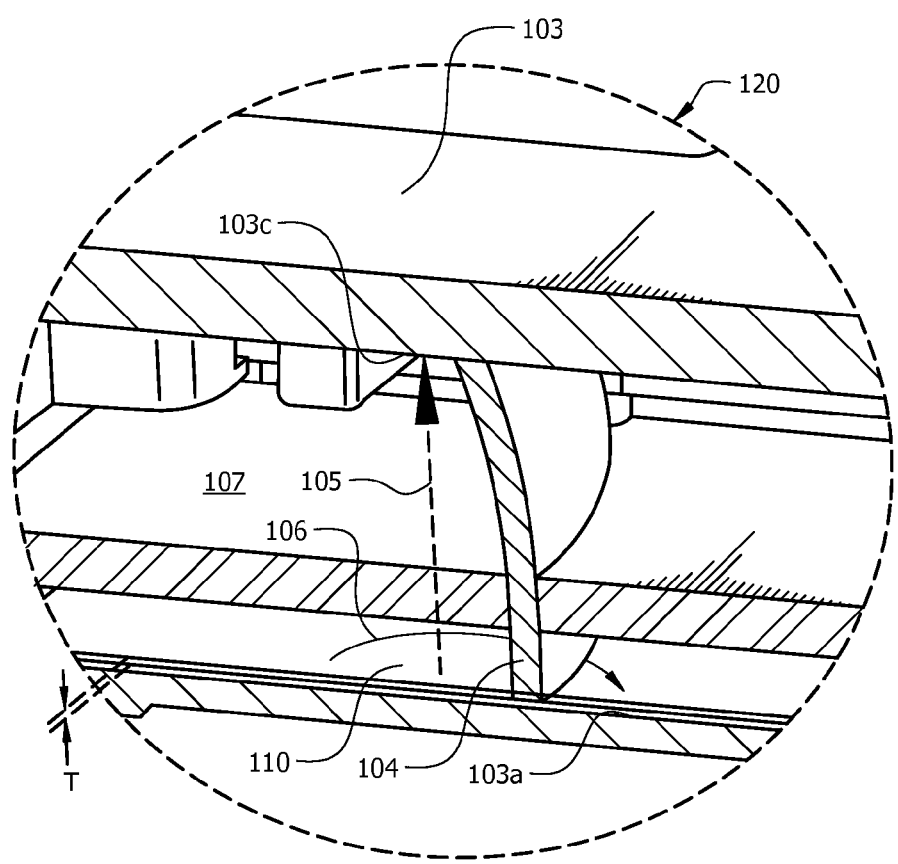
FIG. 5 illustrates a portion of the side cross-sectional view of the module shown in FIG. 4 that has been expanded to demonstrate the manner in which the resistive coating operates to absorb EMI radiation.

The manner in which the EMI shielding system of the invention provides an effective EMI shielding solution to obviate the EMI emission problem described above with reference to FIGS. 1 and 2 will now be described with reference to the illustrative embodiments shown in FIGS. 3-6. FIG. 3 illustrates a top perspective view of a QSFP optical communications module 100 similar to that shown in FIG. 1, except that the QSFP module 100 incorporates an illustrative embodiment of the EMI shielding system of the invention. FIG. 4 illustrates a side cross-sectional view of the module 100 shown in FIG. 3 taken along line A-A', which shows the resistive coating 110 of the EMI shielding system disposed on an inner surface 103a of the metal module housing 103. FIG. 5 illustrates a portion 120 of the side cross-sectional view of the module 100 shown in FIG. 4 that has been expanded to demonstrate the manner in which the resistive coating 110 operates to absorb EMI radiation.

With reference to FIG. 4, like the module 2 shown in FIG. 2, the module 100 includes a PCB 107 and an electrical connector 108. It will be assumed that the PCB 107 has one or more ICs (not shown) mounted on it, and that the PCB 107, the electrical connector 108 and the ICs (not shown for purposes of clarity) are sources of EMI radiation. A resistive coating 110 is disposed on an upper surface 103a of the housing 103. The resistive coating 110 has a thickness, T, that is greater than or equal to at least one skin depth. FIG. 5 shows the circulating current (represented by arrow 106) induced in the resistive coating 110 by the electric filed vector (represented by arrow 105) created by the EMI wave 104 for the dominant $TE_{10}$ mode. As indicated above, most of the circulating current is limited to a single skin depth. Because the resistive coating has a low enough resistivity to support current flow and is at least one skin depth in thickness, the circulating current 106 is mostly contained in the resistive coating 110. Because the resistive coating has a high enough resistivity to be lossy, it absorbs the majority of the circulating current 106. In this way, the resistive coating 110 attenuates a large portion of the EMI radiation that would otherwise escape from the module housing 103, notwithstanding that the opening 103d in the housing 103 for the flex circuit 109 to pass is larger than the maximum allowable EMI aperture as dictated by Faraday cage principles.

In summary, with the EMI shielding system of the invention, the circulating current occurs in the lossy, resistive coating 110, thereby converting the module housing 103 into a lossy waveguide that reduces the EMI emission out of the front 103b of the module housing 103. The resistive coating 100 may be disposed on all surfaces, or on as few as a single surface. The most effective surface for placement of the resistive coating is an interior surface that is the wider of the surfaces of the housing 103 when the housing 103 is viewed as a cross section of a waveguide. Because of the rectangular shape of the housing 103, the surfaces 103a and 103c are the best surfaces for placement of the resistive coating in terms of EMI absorbing efficiency.

Figure 6:
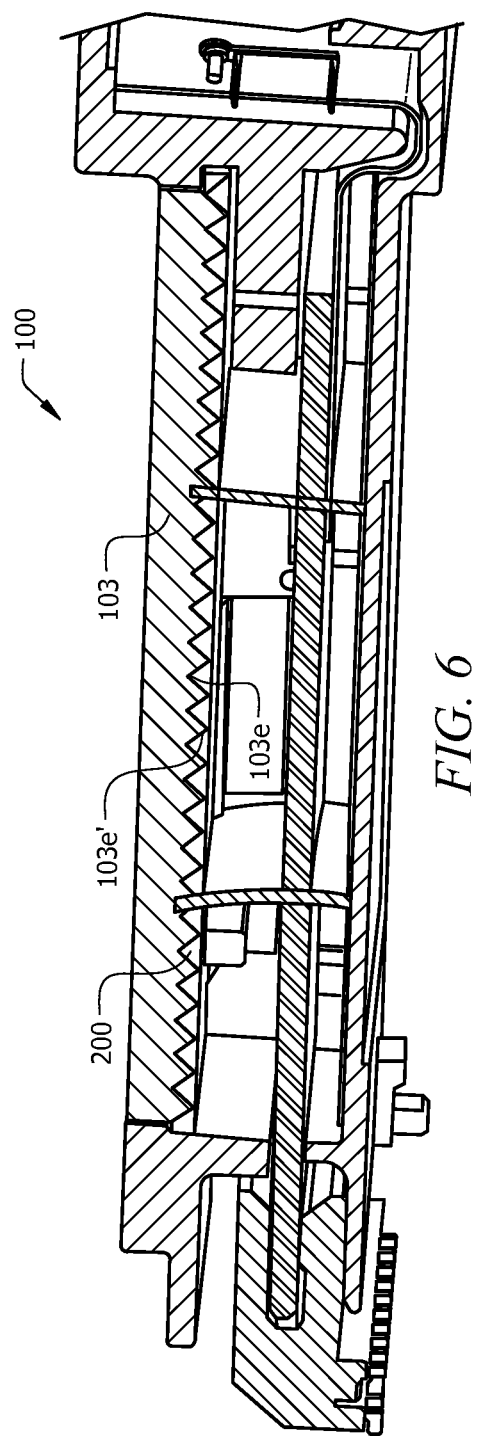
FIG. 6 illustrates a cross-sectional side view of the module shown in FIG. 3 taken along line A-A' having an EMI shielding system in accordance with another illustrative embodiment.

FIG. 6 illustrates a cross-sectional side view of the module 100 shown in FIG. 3 taken along line A-A' having an EMI shielding system in accordance with another illustrative embodiment. In accordance with this illustrative embodiment, an inner surface 103e of the module housing 103 has a pattern of ridges or corrugations formed in it. The resistive coating 200 is applied to the ridge pattern 103e. The points 103e' of the ridge pattern 103e concentrate the electric field such that the resulting circulating current is concentrated in the points 103e'. By disposing the resistive coating 200 on the ridge pattern 103e, the circulating current is concentrated in the resistive coating. This makes the EMI-attenuating effect of the resistive coating 200 even greater than in cases where the resistive coating is applied to a flat surface.

Although the ridge pattern 103e and the resistive coating 200 are shown only on the upper inner surface of the module housing 103, they could be on a different inner surface of the module housing 103 and/or on multiple inner surfaces of the module housing. Also, although the ridge pattern 103e is shown as being a continuous, non-varying pattern, the ridge pattern 103e could have discontinuities and irregularities, while still achieving the EMI shielding goals of the invention.

It should be noted that the invention has been described with respect to illustrative embodiments for the purpose of describing the principles and concepts of the invention. The invention is not limited to these embodiments. As will be understood by those skilled in the art in view of the description being provided herein, modifications may be made to the embodiments described herein without deviating from the scope of the invention. For example, while the invention has been described with reference to a particular type of optical transceiver module, the invention is not limited to being used with optical transceiver modules having any particular configuration.

What is claimed is:

1. An optical communications module comprising:
    an optical communications module housing; and
    a resistive coating disposed on at least one inner surface of the housing, the resistive coating having a thickness that is equal to or greater than one skin depth, the resistive coating having a resistivity that ranges from about 10 ohm-meter to about 400 ohm-meter, and wherein the resistive coating absorbs at least a portion of electromagnetic interference (EMI) radiation produced by at least one source of EMI disposed on or in the optical communications module.

2. The optical communications module of claim 1, wherein the portion of the EMI radiation that is absorbed by the resistive coating corresponds at least to a dominant transverse electric field ($TE_{10}$) mode of the module.

3. The optical communications module of claim 1, wherein the resistive coating has a thickness that is greater than one skin depth.

4. The optical communications module of claim 1, wherein the resistive coating has a resistivity that ranges from about 40 ohm-meter to about 70 ohm-meter.

5. The optical communications module of claim 1, wherein the resistive coating comprises nickel-chromium.

6. The optical communications module of claim 1, wherein the resistive coating comprises stainless steel.

7. The optical communications module of claim 1, wherein the resistive coating comprises carbon-loaded epoxy.

8. The optical communications module of claim 1, wherein the resistive coating comprises a resistive card comprising one or more of mica, a polyimide film, a polyester film, and fused silica.

9. The optical communications module of claim 1, wherein the resistive coating comprises carbon-loaded silicon.

10. The optical communications module of claim 1, wherein the inner surface of the housing on which the resistive coating is disposed is a corrugated, or ridged, surface.

11. A method for providing electromagnetic interference (EMI) shielding, the method comprising:
    providing a optical communications module housing; and
    disposing a resistive coating on at least one inner surface of the housing, the resistive coating having a thickness that is equal to or greater than one skin depth, the resistive coating having a resistivity that ranges from about 10 ohm-meter to about 400 ohm-meter, and wherein the resistive coating absorbs at least a portion of electromagnetic interference (EMI) radiation produced by at least one source of EMI disposed on or in the optical communications module.

12. The method of claim 11, wherein the portion of the EMI radiation that is absorbed by the resistive coating corresponds at least to a dominant transverse electric field ($TE_{10}$) mode of the module.

13. The method of claim 11, wherein the resistive coating has a thickness that is greater than one skin depth.

14. The method of claim 11, wherein the resistive coating has a resistivity that ranges from about 40 ohm-meter to about 70 ohm-meter.

15. The method of claim 11, wherein the resistive coating comprises nickel-chromium.

16. The method of claim 11, wherein the resistive coating comprises stainless steel.

17. The method of claim 11, wherein the resistive coating comprises carbon-loaded epoxy.

18. The method of claim 11, wherein the resistive coating comprises a resistive card comprising one or more of mica, a polyimide film, a polyester film, and fused silica.

19. The method of claim 11, wherein the resistive coating comprises carbon-loaded silicon.

20. The method of claim 11, wherein the inner surface of the housing on which the resistive coating is disposed is a corrugated, or ridged, surface.

* * * * *